(12) United States Patent
Nito

(10) Patent No.: US 11,595,536 B2
(45) Date of Patent: Feb. 28, 2023

(54) MOTOR CONTROL APPARATUS, SHEET CONVEYANCE APPARATUS, AND IMAGE FORMING APPARATUS

(71) Applicant: CANON KABUSHIKI KAISHA, Tokyo (JP)

(72) Inventor: Yuta Nito, Matsudo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 2 days.

(21) Appl. No.: 17/464,541

(22) Filed: Sep. 1, 2021

(65) Prior Publication Data

US 2021/0400157 A1    Dec. 23, 2021

Related U.S. Application Data

(63) Continuation of application No. 16/788,114, filed on Feb. 11, 2020, now Pat. No. 11,140,289, which is a
(Continued)

(30) Foreign Application Priority Data

May 31, 2016   (JP) ................. 2016-109272

(51) Int. Cl.
*H04N 1/00* (2006.01)
*H02P 21/26* (2016.01)
(Continued)

(52) U.S. Cl.
CPC ......... *H04N 1/00652* (2013.01); *G03G 15/50* (2013.01); *G03G 15/5008* (2013.01);
(Continued)

(58) Field of Classification Search
CPC ............ H04N 1/00652; G03G 15/50; G03G 15/5008; G03G 15/6573; H02P 1/04;
(Continued)

(56) References Cited

U.S. PATENT DOCUMENTS 8,816,626 B2 *   8/2014   Kurosawa ............... H02P 6/182
                                                    318/434

FOREIGN PATENT DOCUMENTS

JP   2004-289898 A   10/2004
JP   2005-039955 A    2/2005
(Continued)

*Primary Examiner* — David Luo
(74) *Attorney, Agent, or Firm* — Canon U.S.A., Inc. IP Division

(57) ABSTRACT

An apparatus according to the aspect of the embodiments includes a phase determiner configured to determine a rotational phase of a rotor, a speed determiner configured to determine a rotational speed of the rotor, a controller having a first control mode for controlling the motor by supplying constant currents to windings, and a discriminator configured to discriminate whether a rotation of the motor is abnormal based on the rotational speed when the rotational speed corresponding to a command speed is equal to or higher than a predetermined value in a state where the controller is controlling the motor in the first control mode. When a signal output from the discriminator indicates that the rotation of the motor is abnormal, the controller stops the motor. When the signal output from the discriminator indicates that the rotation is not abnormal, the controller continues a drive of the motor.

12 Claims, 9 Drawing Sheets

Related U.S. Application Data continuation of application No. 15/600,469, filed on May 19, 2017, now Pat. No. 10,602,009.

(51) Int. Cl.
*H02P 21/00* (2016.01)
*H02P 21/34* (2016.01)
*G03G 15/00* (2006.01)
*H02P 29/024* (2016.01)
*H02P 1/04* (2006.01)

(52) U.S. Cl.
CPC ........... *G03G 15/6573* (2013.01); *H02P 1/04* (2013.01); *H02P 21/0021* (2013.01); *H02P 21/26* (2016.02); *H02P 21/34* (2016.02); *H02P 29/0241* (2016.02); *H04N 1/00602* (2013.01)

(58) Field of Classification Search
CPC ...... H02P 21/0021; H02P 21/26; H02P 21/34; H02P 29/0241
USPC ............................. 318/400.02, 400.01, 700
See application file for complete search history.

(56) References Cited

FOREIGN PATENT DOCUMENTS

| | | |
|---|---|---|
| JP | 2008-278595 A | 11/2008 |
| JP | 2012-050284 A | 3/2012 |
| JP | 2015-000789 A | 1/2015 |
| JP | 2016-046859 A | 4/2016 |

\* cited by examiner

MOTOR CONTROL APPARATUS, SHEET CONVEYANCE APPARATUS, AND IMAGE FORMING APPARATUS

CROSS-REFERENCE TO RELATED APPLICATION

This application is a Continuation of U.S. application Ser. No. 16/788,114, filed Feb. 11, 2020; which is a Continuation of U.S. application Ser. No. 15/600,469, filed May 19, 2017, now U.S. patent Ser. No. 10/602,009, issued Mar. 24, 2020; which claims priority from Japanese Patent Application No. 2016-109272, filed May 31, 2016, which are hereby incorporated by reference herein in their entireties.

BACKGROUND OF THE INVENTION

Field of the Invention

The aspect of the embodiments relates to a motor control apparatus for detecting whether a motor is in a step-out state, a sheet conveyance apparatus, and an image forming apparatus.

Description of the Related Art

A conventional motor control method is known to control a motor by controlling the current value in a rotating coordinate system based on the rotational phase of the rotor of the motor. This control method is referred to as vector control. Specifically, the motor control method is known to perform phase feedback control for controlling the current value in the rotating coordinate system so as to reduce the deviation between a command phase and the rotational phase of the rotor. Another motor control method is known to perform speed feedback control for controlling the current value in the rotating coordinate system so as to reduce the deviation between a command speed and a rotational speed of the rotor.

In vector control, the driving current supplied to each of windings of a motor is represented by the q-axis component (torque current component) that is a current component for generating torque for rotating the rotor and the d-axis component (exciting current component) that is a current component affecting the intensities of the magnetic fluxes penetrating the windings of the motor. Torque for rotation is efficiently generated by controlling the value of the torque current component in response to a variation of the load torque applied to the rotor. As a result, the increase in motor sound and power consumption due to excessive torque can be prevented. If the load torque applied to the rotor exceeds the output torque corresponding to the driving currents supplied to the windings of the motor, the rotor does not synchronize with an input signal, resulting in an uncontrollable state (step-out state) of the motor. The above-described vector control enables preventing the motor from entering a step-out state.

In vector control, a configuration for determining the rotational phase of the rotor is required. U.S. Pat. No. 8,970,146 discusses a configuration in which the rotational phase of a rotor is determined based on the induced voltage generated in the winding of each phase of a motor when the rotor rotates.

The magnitudes of the induced voltages generated in the windings decreases with decreasing rotational speed of the rotor. When the magnitudes of the induced voltages generated in the windings are not sufficient to determine the rotational phase of the rotor, the rotational phase may not be accurately determined. In other words, the lower the rotational speed of the rotor, the lower the accuracy of determining the rotational phase of the rotor.

Japanese Patent Application Laid-Open No. 2005-39955 discusses a configuration in which constant-current control is used when a command speed of the rotor of a motor is lower than a predetermined rotational speed. In constant-current control, the motor is controlled by supplying a constant current to each of the windings of the motor. In constant-current control, neither phase feedback control nor speed feedback control is performed. Japanese Patent Application Laid-Open No. 2005-39955 also discusses a configuration in which vector control is used when the command speed of the rotor is equal to or higher than the predetermined rotational speed.

In constant-current control, a constant current is supplied to each of the windings of the motor regardless of the actual rotation state of the rotor. Therefore, in constant-current control, the load torque applied to the rotor may exceed the output torque corresponding to the driving currents supplied to the windings, possibly resulting in a step-out state of the motor. Therefore, there has been a demand for a configuration in which the step-out discrimination can be accurately performed in constant-current control.

SUMMARY OF THE INVENTION

The aspect of the embodiments is directed to accurately performing the step-out discrimination in a first control mode for controlling a motor by supplying a constant current to each of the windings of the motor.

According to an aspect of the embodiments, an apparatus for controlling a motor based on a command phase indicating a target phase of a rotor of the motor includes a phase determiner configured to determine a rotational phase of the rotor, a speed determiner configured to determine a rotational speed of the rotor based on a variation of the rotational phase in a predetermined time period, a controller having a first control mode for controlling the motor by supplying a constant current to each of windings of the motor, and a discriminator configured to output a signal indicating whether a rotation of the motor is abnormal based on the rotational speed when a rotational speed corresponding to a command speed indicating a target speed of the rotor is equal to or higher than a predetermined value in a state where the controller is controlling the motor by using the first control mode. When the signal output from the discriminator indicates that the rotation of the motor is abnormal, the controller stops the motor. When the signal output from the discriminator indicates that the rotation of the motor is not abnormal, the controller continues a drive of the motor.

Further features of the disclosure will become apparent from the following description of exemplary embodiments with reference to the attached drawings.

DESCRIPTION OF THE EMBODIMENTS

Exemplary embodiments according to the disclosure will be described below with reference to the accompanying drawings. However, shapes and relative arrangements of elements described in the exemplary embodiments are not limited thereto, and should be modified as required depending on the configuration of an apparatus according to the disclosure and other various conditions. The scope of the disclosure is not limited to the exemplary embodiments described below. Although, in the following descriptions, a motor control apparatus is included in an image forming apparatus, the location of a motor control apparatus is not limited thereto. For example, a motor control apparatus is also used for a sheet conveyance apparatus for conveying sheets such as recording media and document sheets.

[Image Forming Apparatus]

Figure 1:
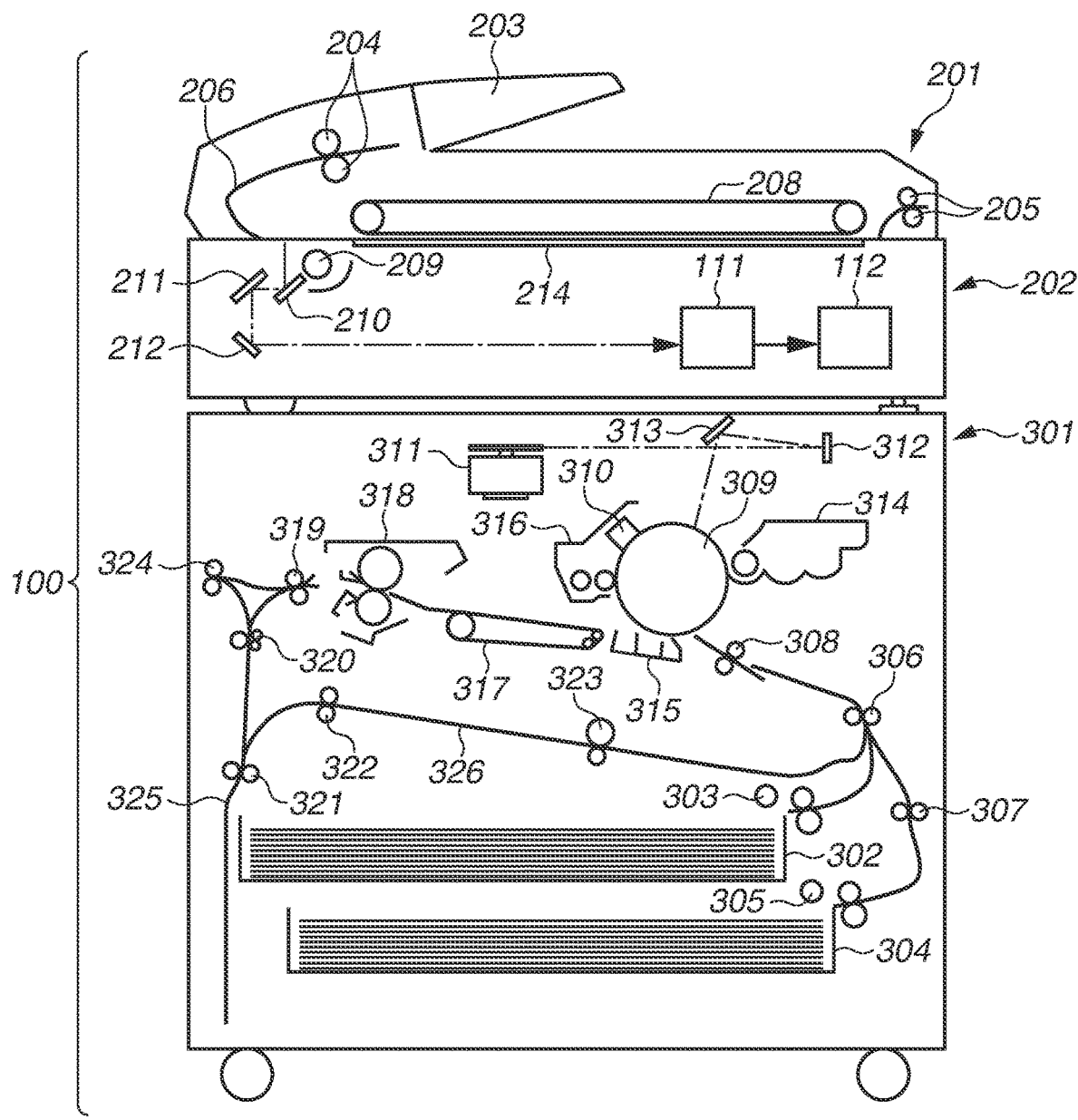
FIG. 1 is a sectional view illustrating an image forming apparatus according to a first exemplary embodiment.

FIG. 1 is a sectional view illustrating a configuration of a monochrome electrophotographic copying machine (hereinafter referred to as an image forming apparatus) 100 having a sheet conveyance apparatus according to a first exemplary embodiment. The image forming apparatus 100 is not limited to a copying machine and may be, for example, a facsimile, a printing machine, or a printer. The recording process is not limited to the electrophotographic process and may be, for example, the ink-jet recording process. Further, the type of the image forming apparatus 100 may be either the monochrome type or a color type.

The configuration and functions of the image forming apparatus 100 will be described below with reference to FIG. 1. The image forming apparatus 100 includes a document feeder 201, a reading apparatus 202, and an image printing apparatus 301.

Document sheets stacked on a document stacker 203 of the document feeder 201 are fed one by one by a feed roller 204. A document sheet passes through a conveyance guide 206 and is conveyed to a document positioning glass plate 214 of the reading apparatus 202. Then, the document sheet is conveyed at a fixed speed by a conveyance belt 208 and is discharged out of the image forming apparatus 100 by a discharge roller 205. Reflected light from a document illuminated by an illumination 209 at the reading position of the reading apparatus 202 is guided to an image reading unit 111 by an optical system including reflective mirrors 210, 211, and 212, and is converted into an image signal by the image reading unit 111. The image reading unit 111 includes lenses, a charge coupled device (CCD) sensor that is a photoelectric conversion element, and a driving circuit for driving the CCD sensor. The image signal output from the image reading unit 111 undergoes various kinds of correction processing by an image processing unit 112 including hardware devices such as an application specific integrated circuit (ASIC). Then, the image signal is output to the image printing apparatus 301. As described above, a document reading process is performed. More specifically, the document feeder 201 and the reading apparatus 202 function as a document reading apparatus.

There are two different document reading modes: a first reading mode and a second reading mode. In the first reading mode, the illumination system 209 and the optical system fixed to a predetermined position read an image of a document being conveyed at a fixed speed. In the second reading mode, the illumination system 209 and the optical system moving at a fixed speed read an image of a document placed on the document positioning glass plate 214 of the reading apparatus 202. Normally, an image of a document sheet is read in the first reading mode, and an image of a bound document is read in the second reading mode.

The image printing apparatus 301 includes sheet storage trays 302 and 304 for storing different types of recording media. For example, A4-size plain paper is stored in the sheet storage tray 302, and A4-size thick paper is stored in the sheet storage tray 304. A recording medium refers to a medium on which an image is formed by the image forming apparatus 100. Recording media include paper, resin sheets, cloths, overhead projector (OHP) sheets, and labels.

A recording medium stored in the sheet storage tray 302 is fed by a feed roller 303 and then is sent to a registration roller 308 by a conveyance roller 306. A recording medium stored in the sheet storage tray 304 is fed by a feed roller 305 and then is sent to the registration roller 308 by conveyance rollers 307 and 306.

The image signal output from the reading apparatus 202 is input to a light scanning apparatus 311 including a semiconductor laser device and a polygon mirror. The outer circumferential surface of a photosensitive drum 309 is charged by a charging unit 310. After the outer circumferential surface of the photosensitive drum 309 is charged, the outer circumferential surface of the photosensitive drum 309 is irradiated with laser light from the light scanning apparatus 311 via the polygon mirror and mirrors 312 and 313. The laser light corresponds to the image signal input from the reading apparatus 202 to the light scanning apparatus 311. As a result, an electrostatic latent image is formed on the outer circumferential surface of the photosensitive drum 309.

Then, a developing unit 314 develops the electrostatic latent image by using toner to form a toner image on the outer circumferential surface of the photosensitive drum 309. The toner image formed on the photosensitive drum 309 is transferred onto the recording medium by a transfer charging unit 315 disposed at a position (transfer position) facing the photosensitive drum 309. In synchronization with the transfer timing, the registration roller 308 sends the recording medium to the transfer position.

As described above, the recording medium with a toner image transferred thereon is sent to a fixing unit 318 by a conveyance belt 317, and heated and pressurized by the fixing unit 318. Then, the toner image is fixed onto the recording medium. In this way, an image is formed on the recording medium by the image forming apparatus 100.

When image forming is performed in the one-sided printing mode, the recording medium that has passed the fixing unit 318 is discharged onto a discharge tray (not illustrated) by discharge rollers 319 and 324. When image forming is performed in the both-sided printing mode, the first surface of the recording medium undergoes fixing processing by the fixing unit 318, and then the recording medium is conveyed to an inversion path 325 by the discharge roller 319, a conveyance roller 320, and an inversion roller 321. Subsequently, the recording medium is conveyed again to the registration roller 308 by conveyance rollers 322 and 323, and an image is formed on the second surface of the recording medium by using the above-described method. Then, the recording medium is discharged onto the discharge tray (not illustrated) by the discharge rollers 319 and 324.

In a case where the recording medium with an image formed on the first surface is discharged out of the image forming apparatus 100 in a face-down state, the recording medium that has passed through the fixing unit 318 passes through the discharge roller 319, and is conveyed in the direction toward the conveyance roller 320. Then, immediately before the trailing edge of the recording medium passes the NIP portion of the conveyance roller 320, the rotation of the conveyance roller 320 is reversed. Then, the recording medium passes through the discharge roller 324 and is discharged out of the image forming apparatus 100 in a face-down state.

This completes descriptions of the configuration and functions of the image forming apparatus 100. Loads according to the aspect of the embodiments refer to targets to be driven by a motor. Various rollers (conveyance rollers) including the feed rollers 204, 303, and 305, the registration roller 308, and the discharge roller 319, the photosensitive drum 309, the conveyance belts 208 and 317, the illumination system 209, and the optical system are loads according to the aspect of the embodiment. A motor control apparatus according to the present exemplary embodiment is applicable to the motor for driving these loads.

Figure 2:
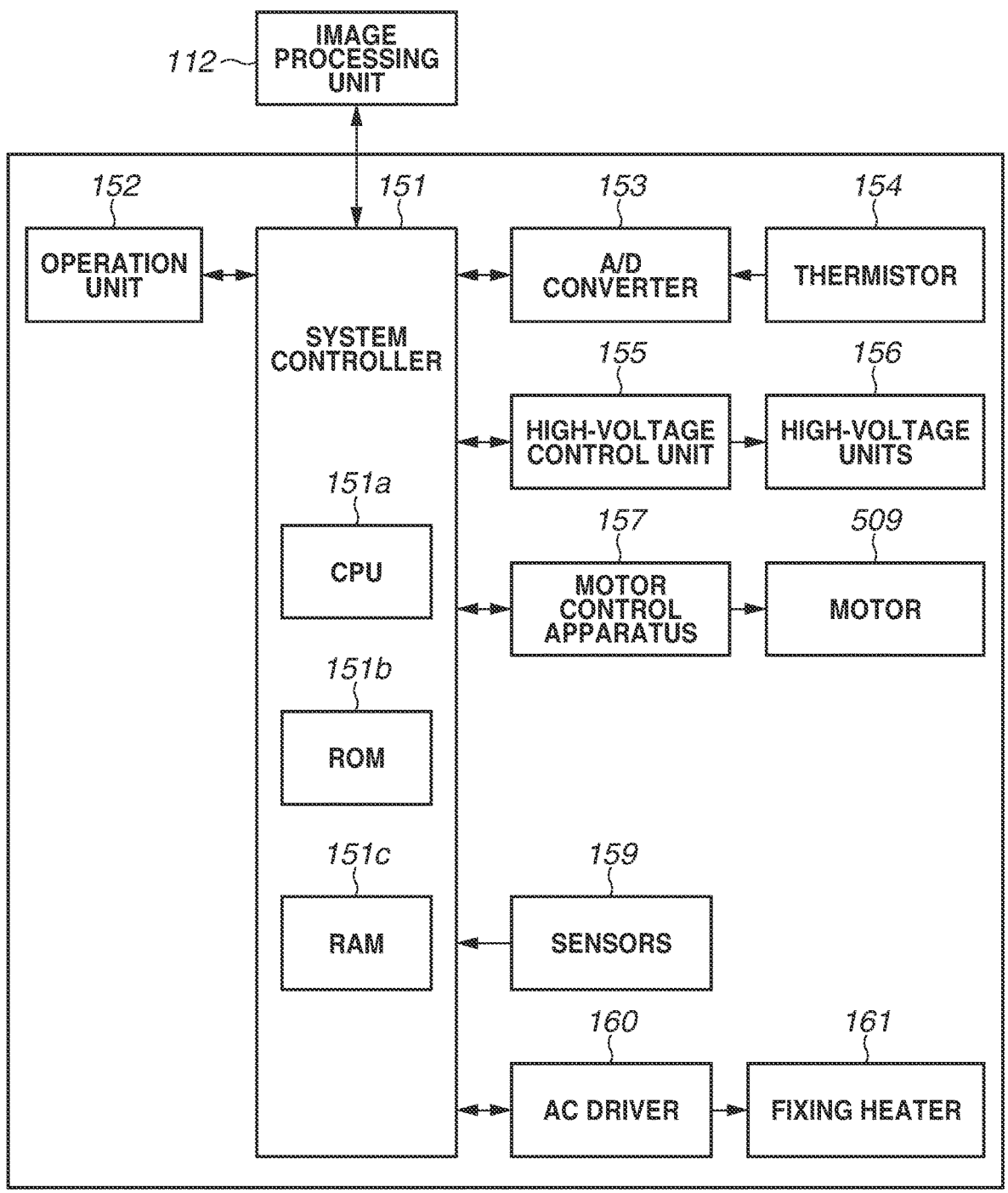
FIG. 2 is a block diagram illustrating a control configuration of the image forming apparatus.

FIG. 2 is a block diagram illustrating an example of a control configuration of the image forming apparatus 100. As illustrated in FIG. 2, a system controller 151 includes a central processing unit (CPU) 151a, a read only memory (ROM) 151b, and a random access memory (RAM) 151c. The system controller 151 is connected with the image processing unit 112, an operation unit 152, an analog-to-digital (A/D) converter 153, a high-voltage control unit 155, a motor control apparatus 157, sensors 159, and an alternating current (AC) driver 160. The system controller 151 can transmit and receive data and commands to/from the connected units.

The CPU 151a reads various programs stored in the ROM 151b and then executes them to implement various sequences related to a predetermined image forming sequence.

The RAM 151c is a storage device for storing various kinds of data including setting values for the high-voltage control unit 155, command values for the motor control apparatus 157, and information received from the operation unit 152.

The system controller 151 transmits to the image processing unit 112 various setting values of the apparatuses included in the image forming apparatus 100, for image processing by the image processing unit 112. The system controller 151 receives signals from the sensors 159, and sets the setting values of the high-voltage control unit 155 based on the received signals. The high-voltage control unit 155 supplies voltages for high-voltage units 156 (the charging unit 310, the developing unit 314, the transfer charging unit 315, etc.) according to the setting values set by the system controller 151. The sensors 159 include sensors for detecting a recording medium conveyed by the conveyance rollers.

The motor control apparatus 157 controls a motor 509 in response to a command output from the CPU 151a. Although, in FIG. 2, only the motor 509 is illustrated as a motor for driving the loads, a plurality of motors is actually included in the image forming apparatus 100. One motor control apparatus 157 may be configured to control a plurality of motors. Although, in FIG. 2, only one motor control apparatus 157 is included in the image forming apparatus 100, a plurality of motor control apparatuses is actually included in the image forming apparatus 100.

The A/D converter 153 receives a detection signal detected by a thermistor 154 for detecting the temperature of a fixing heater 161, converts the detection signal from an analog signal into a digital signal, and transmits the digital signal to the system controller 151. The system controller 151 controls the AC driver 160 based on the digital signal received from the A/D converter 153. The AC driver 160 controls the temperature of the fixing heater 161 to attain the temperature required to perform fixing processing. The fixing heater 161 is used for fixing processing and is included in the fixing unit 318.

The system controller 151 controls the operation unit 152 to display on a display unit of the operation unit 152 operation screens for allowing a user to set, for example, the type of the recording medium to be used. The system controller 151 controls operation sequences of the image forming apparatus 100 based on information set by the user. The system controller 151 transmits information indicating the status of the image forming apparatus 100 to the operation unit 152. The information indicating the status of the image forming apparatus 100 refers to information about the number of sheets for image formation, the progress of the image forming operation, and sheet jam and double feed in the document reading apparatus 201 and the image printing apparatus 301. The operation unit 152 displays information received from the system controller 151 on the display unit.

As described above, the system controller 151 controls operation sequences of the image forming apparatus 100.

[Motor Control Apparatus]

<Vector Control>

The motor control apparatus 157 according to the present exemplary embodiment will be described below. The motor control apparatus 157 according to the present exemplary embodiment can control a motor based on both vector control and constant-current control. The motor according to the present exemplary embodiment does not include sensors such as a rotary encoder for detecting the rotational phase of the rotor of the motor.

Vector control performed by the motor control apparatus 157 according to the present exemplary embodiment will be described below with reference to FIGS. 3 and 4.

Figure 3:
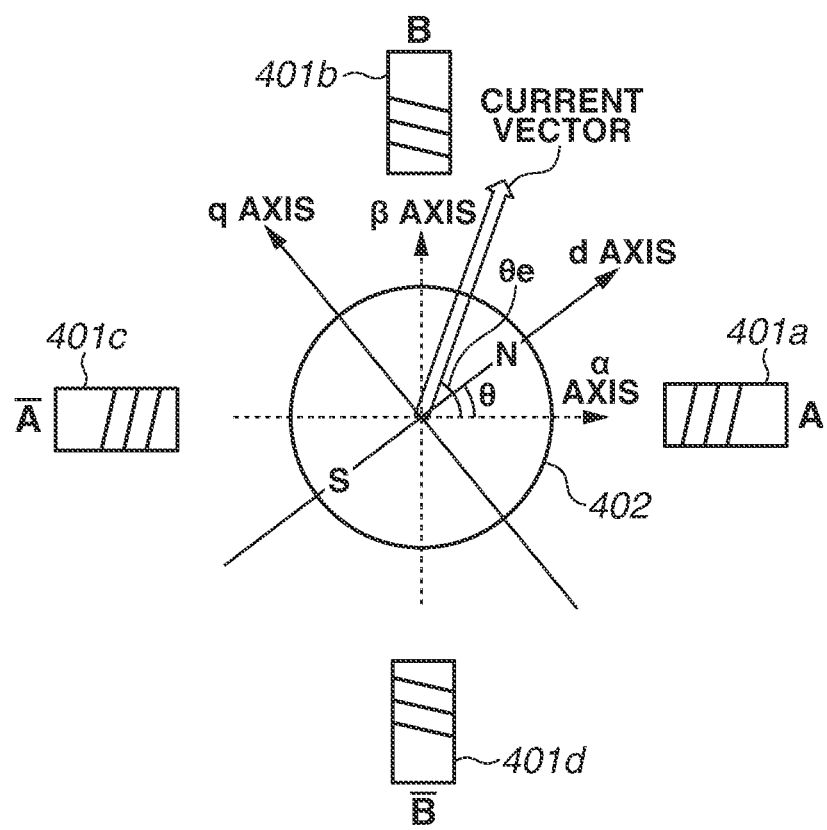
FIG. 3 illustrates a relation between a 2-phase motor having the A and B phases and the d- and q-axes of a rotating coordinate system.

FIG. 3 illustrates a relation between a stepping motor (hereafter referred to as a motor) 509 having two phases, the A phase (first phase) and the B phase (second phase), and a rotating coordinate system represented by the d- and q-axes. Referring to FIG. 3, in a stationary coordinate system, the α axis is defined as an axis corresponding to the winding of the A phase, and the β axis is defined as an axis corresponding to the winding of the B phase. Referring to FIG. 3, the d axis is defined in the direction of the magnetic flux made by the magnetic pole of the permanent magnet used for a rotor 402, and the q axis is defined as an axis perpendicularly intersecting with the d-axis, i.e., the q axis leads the d axis by 90 degrees in the counterclockwise direction. The angle between the α and d-axes is defined as θ, and the rotational phase of the rotor 402 is represented by the angle θ. In vector control, the rotating coordinate system based on the rotational phase θ of the rotor 402 is used. More specifically, in vector control, the value of the q-axis component (torque current component) generating torque in the rotor 402 and the value of the d-axis component (exciting current component) affecting the intensities of the magnetic fluxes penetrating the windings are used. These components are current components of the current vector corresponding to the driving currents flowing in the windings in the rotating coordinate system.

Vector control refers to a technique for controlling a motor by performing phase feedback control in which the value of the torque current component and the value of the exciting current component are controlled so as to reduce the deviation between the command phase indicating a target phase of the rotor and the actual rotational phase thereof. There is another technique for controlling a motor by performing speed feedback control in which the value of the torque current component and the value of the exciting current component are controlled so as to reduce the deviation between the command speed indicating a target speed of the rotor 402 and the actual rotational speed thereof.

Figure 4:
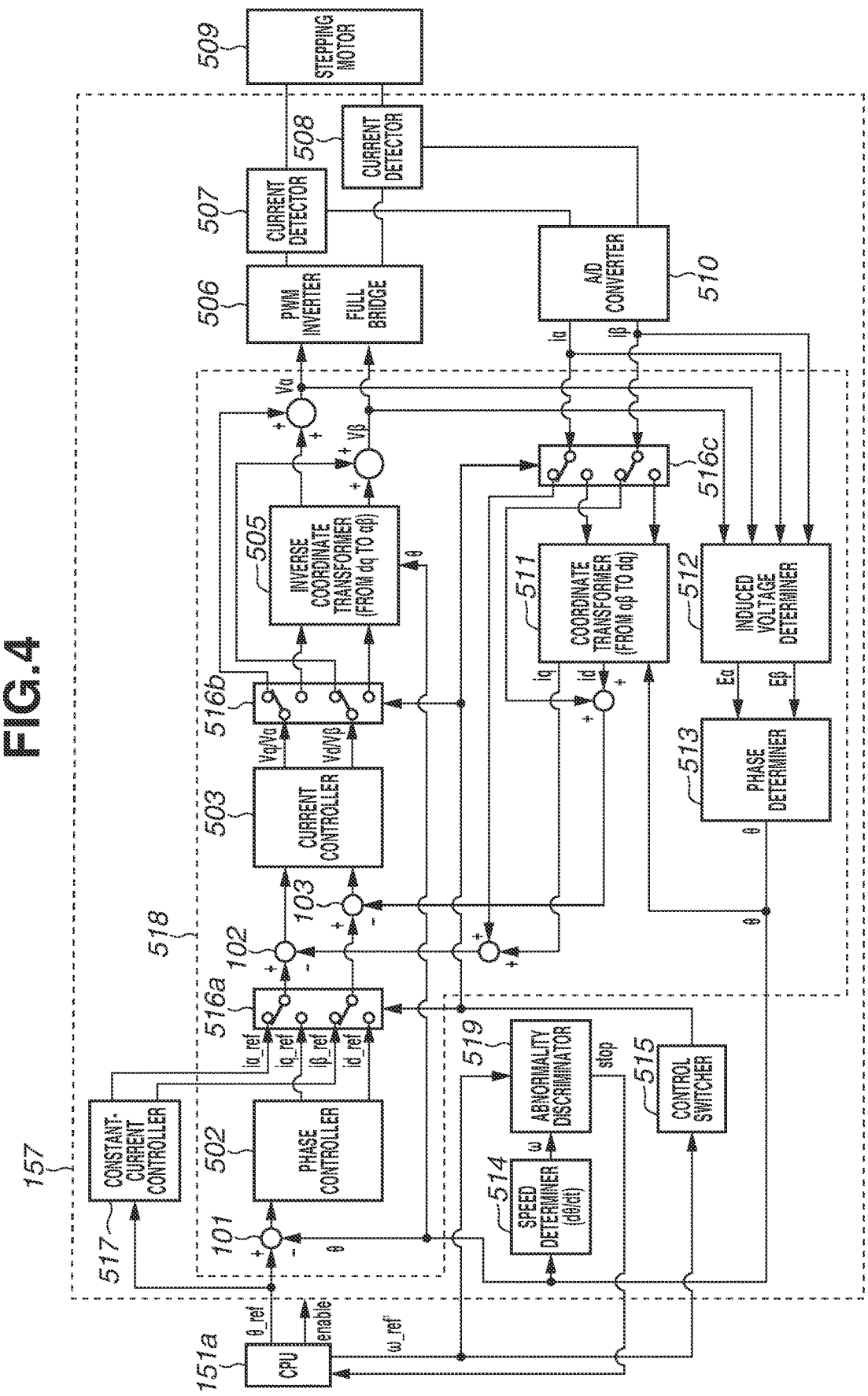
FIG. 4 is a block diagram illustrating a configuration of a motor control apparatus according to the first exemplary embodiment.

FIG. 4 is a block diagram illustrating an example of a configuration of the motor control apparatus 157 for controlling the drive of the motor 509. The motor control apparatus 157 includes at least one ASIC and performs the following functions.

As illustrated in FIG. 4, the motor control apparatus 157 includes a constant-current controller 517 for performing constant-current control and a vector controller 518 for performing vector control. The motor control apparatus 157 further includes a configuration for switching the controller to be used to control the drive of the motor 509 between the constant-current controller 517 and the vector controller 518 based on the command speed of the rotor 402. More specifically, the motor control apparatus 157 includes a control switcher 515 and control selection switches 516*a*, 516*b*, and 516*c* (hereinafter referred to as switches).

The motor control apparatus 157 includes a phase controller 502, a current controller 503, an inverse coordinate transformer 505, a coordinate transformer 511, and a pulse width modulation (PWM) inverter 506 as circuits for performing vector control. The coordinate transformer 511 converts the current vector corresponding to the driving currents flowing in the windings of the A and B phases of the motor 509 from the stationary coordinate system represented by the α and β axes to the rotating coordinate system represented by the q and d axes. As a result, the current vector corresponding to the driving currents to be supplied to the windings of the A and B phases of the motor 509 is represented by the q-axis component value (q-axis current) and the d-axis component value (d-axis current) in the rotating coordinate system. The q-axis current is equivalent to a torque current for generating torque in the rotor 402 of the motor 509. The d-axis current is equivalent to the exciting current affecting the intensities of the magnetic fluxes penetrating the windings of the motor 509, and does not contribute to the generation of torque in the rotor 402. The motor control apparatus 157 can independently control each of the q-axis current and the d-axis current. As a result, the motor control apparatus 157 can efficiently generate torque for the rotation of the rotor 402.

The motor control apparatus 157 determines the rotational phase θ of the rotor 402 of the motor 509 based on a method (described below), and performs vector control based on the determination result. The CPU 151*a* generates a command phase θ_ref representing the target phase of the rotor 402 of the motor 509, and outputs the command phase θ_ref to the motor control apparatus 157 at predetermined time intervals.

A subtracter 101 calculates the deviation between the rotational phase θ of the rotor 402 of the motor 509 and the command phase θ_ref, and outputs the deviation to the phase controller 502. The phase controller 502 generates and outputs a q-axis current command value iq_ref and a d-axis current command value id_ref so as to reduce the deviation output from the subtracter 101, based on proportional control (P), integral control (I), and differential control (D). More specifically, the phase controller 502 generates and outputs the q-axis current command value iq_ref and the d-axis current command value id_ref so that the deviation output from the subtracter 101 is equal to zero based on P control, I control, and D control. P control refers to a control method for controlling the value of a control target based on a value proportional to the deviation between a command value and an estimated value. I control refers to a control method for controlling the value of a control target based on a value proportional to the time integration of the deviation between a command value and an estimated value. D control refers to a control method for controlling the value of a control target based on a value proportional to variation of the deviation between a command value and an estimated value in a predetermined time period. Although the phase controller 502 according to the present exemplary embodiment generates the q-axis current command value iq_ref and the d-axis current command value id_ref based on PID control, the generation method is not limited thereto. For example, the phase controller 502 may generate the q-axis current command value iq_ref and the d-axis current command value id_ref based on PI control. When a permanent magnet is used as the rotor 402, the d-axis current command value id_ref affecting the intensity of the magnetic flux penetrating the winding is normally set to 0, the control method is not limited thereto.

The respective driving currents flowing in the windings of the A and B phases of the motor 509 are detected by current detectors 507 and 508. Then, the detected driving current is converted from an analog value into a digital value by an A/D converter 510.

The current values of the driving current, which is converted from an analog value into a digital value by the A/D converter 510, are represented as current values iα and iβ in the stationary coordinate system according to formulas (1) and (2), respectively, where θe denotes the phase of the current vector illustrated in FIG. 3. The phase θe of the current vector is defined as the angle formed between the α axis and the current vector. "I" denotes the magnitude of the current vector.

$$i\alpha = I^* \cos \theta e \qquad (1)$$

$$i\beta = I^* \sin \theta e \qquad (2)$$

These current values iα and β are input to the coordinate transformer 511 and an induced voltage determiner 512.

The coordinate transformer 511 converts the current values iα and iβ in the stationary coordinate system into a current value iq of the q-axis current and a current value id of the d-axis current in the rotating coordinate system, by using formulas (3) and (4).

$$id = \cos \theta^* i\alpha + \sin \theta^* i\beta \qquad (3)$$

$$iq = -\sin \theta^* i\alpha + \cos \theta^* i\beta \qquad (4)$$

The q-axis current command value iq_ref output from the phase controller 502 and the current value iq output from the coordinate transformer 511 are input to a subtracter 102. The subtracter 102 calculates the deviation between the q-axis current command value iq_ref and the current value iq, and outputs the deviation to the current controller 503.

The d-axis current command value id_ref output from the phase controller 502 and the current value id output from the coordinate transformer 511 are input to a subtracter 103. The subtracter 103 calculates the deviation between the d-axis current command value id_ref and the current value id, and outputs the deviation to the current controller 503.

Based on PID control, the current controller 503 generates driving voltages Vq and Vd so as to reduce the deviation. Specifically, the current controller 503 generates the driving voltages Vq and Vd so that the deviation is equal to zero, and outputs the driving voltages Vq and Vd to the inverse coordinate transformer 505. More specifically, the current controller 503 functions as a generation unit. Although the current controller 503 according to the present exemplary embodiment generates the driving voltages Vq and Vd based on PID control, the generation method is not limited thereto. For example, the current controller 503 may generate the driving voltages Vq and Vd based on PI control.

The inverse coordinate transformer 505 inversely transforms the driving voltages Vq and Vd in the rotating coordinate system output from the current controller 503 into driving voltages Vα and Vβ in the stationary coordinate system, by using formulas (5) and (6).

$$V\alpha = \cos\theta * Vd - \sin\theta * Vq \quad (5)$$

$$v\beta = \sin\theta * Vd + \cos\theta * Vq \quad (6)$$

The inverse coordinate transformer 505 outputs the driving voltages Vα and Vβ obtained as a result of inverse transform to the induced voltage determiner 512 and the PWM inverter 506.

The PWM inverter 506 includes a full bridge circuit. The full bridge circuit is driven by a PWM signal based on the driving voltages Vα and Vβ input from the inverse coordinate transformer 505. As a result, the PWM inverter 506 generates the driving currents iα and iβ corresponding to the driving voltages Vα and Vβ, respectively, and supplies the driving currents iα and iβ to the windings of the phases of the motor 509 to drive the motor 509. More specifically, the PWM inverter 506 functions as a current supply unit for supplying a current to the winding of each phase of the motor 509. Although, in the present exemplary embodiment, the PWM inverter includes a full bridge circuit, the PWM inverter may include a half bridge circuit.

A method for determining the rotational phase θ of the rotor 402 will be described below. To determine the rotational phase θ of the rotor 402, the values of induced voltages Eα and Eβ are used. The induced voltages Eα and Eβ are induced in the respective windings of the A and B phases of the motor 509, by the rotation of the rotor 402. The values of the induced voltages Eα and Eβ are determined (calculated) by the induced voltage determiner 512. More specifically, the induced voltages Eα and Eβ are determined based on the current values iα and iβ input from the A/D converter 510 to the induced voltage determiner 512, and the driving voltages Vα and Vβ input from the inverse coordinate transformer 505 to the induced voltage determiner 512, by using formulas (7) and (8).

$$E\alpha = V\alpha - R*i\alpha - L*di\alpha/dt \quad (7)$$

$$E\beta = V\beta - R*i\beta - L*di\beta/dt \quad (8)$$

R denotes the winding resistance and L denotes the winding inductance. The values of the winding resistance R and the winding inductance L are specific to the motor 509 being used, and prestored in the ROM 151b or a memory (not illustrated) provided in the motor control apparatus 157.

The induced voltages Eα and Eβ determined by the induced voltage determiner 512 are output to the phase determiner 513.

The phase determiner 513 determines the rotational phase θ of the rotor 402 of the motor 509 based on the ratio between the induced voltage Eβ and the induced voltage Eα output from the induced voltage determiner 512 by using formula (9).

$$\theta = \tan^{-1}(-E\beta/E\alpha) \quad (9)$$

Although, in the present exemplary embodiment, the phase determiner 513 determines the rotational phase θ by performing a calculation based on the formula (9), the determination method is not limited thereto. For example, the phase determiner 513 may determine the rotational phase θ by referring to a table indicating a relation between the induced voltages Eα and Eβ and the rotational phase θ corresponding to the induced voltages Eα and Eβ stored in the ROM 151b.

The rotational phase θ of the rotor 402 obtained in this way is input to the subtracter 101, the inverse coordinate transformer 505, the coordinate transformer 511, and the speed determiner 514.

The speed determiner 514 determines the rotational speed ω of the rotor 402 based on a variation of the rotational phase θ input from the phase determiner 513 in a predetermined time period. More specifically, the speed determiner 514 determines the rotational speed ω by using formula (10).

$$\omega = d\theta/dt \quad (10)$$

The speed determiner 514 outputs the determined rotational speed ω to an abnormality discriminator 519 which is to be described below.

The motor control apparatus 157 repeats the above control.

As described above, the motor control apparatus 157 according to the present exemplary embodiment performs vector control by using phase feedback control for controlling the current values in the rotating coordinate system so as to reduce the deviation between the command phase θ_ref and the rotational phase θ. Performing vector control enables restricting a step-out state of the motor 509 and the increase in motor sound and power consumption due to residual torque. Performing phase feedback control enables the rotational phase of the rotor 402 to be controlled so that the rotor has a desired rotational phase. Therefore, the image forming apparatus 100 suitably performs image forming on a recording medium by applying vector control based on phase feedback control to the motor 509 for driving loads (for example, the registration roller 308) with which the rotational phase of the rotor 402 is to be accurately controlled.

<Constant-Current Control>

Constant-current control will be described below with reference to FIG. 4. Constant-current control refers to a control method for controlling a motor by supplying constant currents to the windings of the motor. In constant-current control, neither phase feedback control nor speed feedback control is performed.

The CPU 151a outputs the command phase θ_ref to the constant-current controller 517. The constant-current controller 517 generates and outputs current command values iα_ref and iβ_ref in the stationary coordinate system corresponding to the command phase θ_ref output from the CPU 151a.

Then, the current detectors 507 and 508 detect the driving currents flowing in the respective windings of the A and B phases of the motor 509. Subsequently, the detected driving current is converted from an analog value into a digital value by the A/D converter 510. The current values iα and iβ are represented by formulas (1) and (2), respectively. The deviation between the current value iα and the command value iα_ref and the deviation between the current value iβ and the command value iβ_ref are input to the current controller 503. The current controller 503 outputs the driving voltages Vα and Vβ to decrease the above-described deviation. Specifically, the current controller 503 outputs the driving voltages Vα and Vβ so that the deviation approaches 0. The driving voltages Vα and Vβ output from the current controller 503 are input to the PWM inverter 506. The PWM inverter 506 drives the motor 509 by supplying the driving current to the winding of each phase of the motor 509 by using the above-described method.

This completes descriptions of constant-current control.

<Switching between Vector Control and Constant Current Control>

A method for switching between vector control and constant-current control will be described below. As illustrated in FIG. 4, the motor control apparatus 157 according to the present exemplary embodiment is configured to switch between constant-current control and vector control. Specifically, the motor control apparatus 157 includes the control switcher 515 and the switches 516a, 516b, and 516c.

Figure 5:
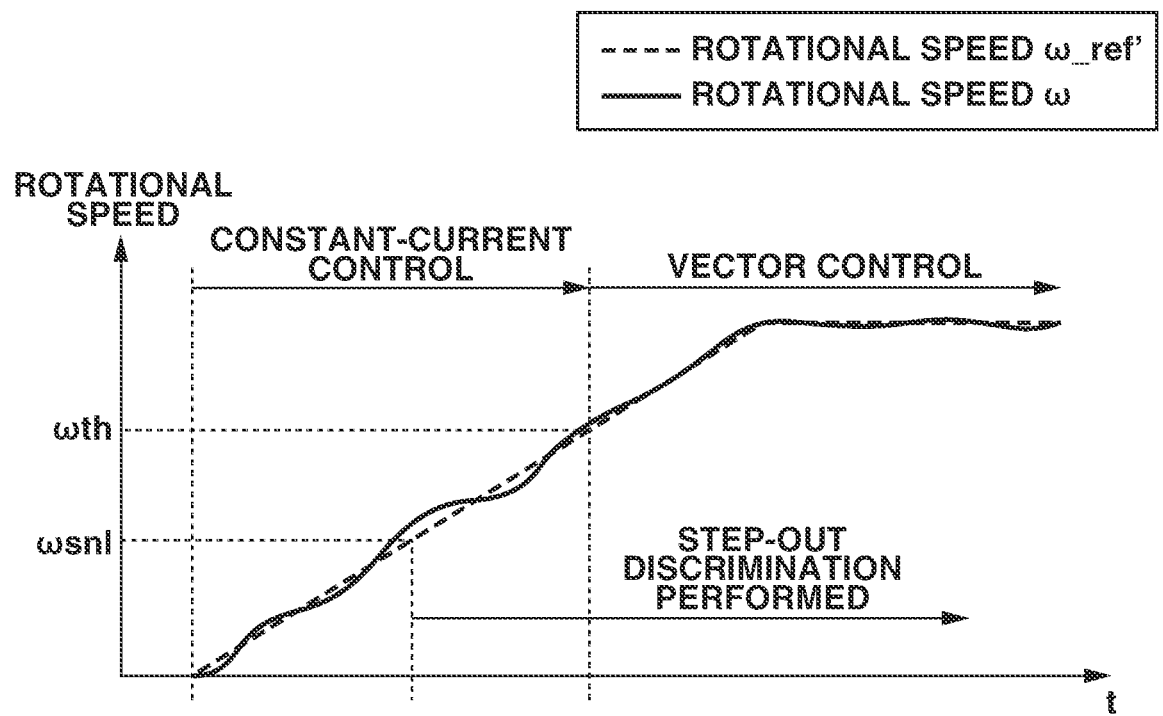
FIG. 5 illustrates a relation between a rotational speeds $\omega\_ref$ and $\omega$ and threshold values $\omega th$ and $\omega snl$.

FIG. 5 illustrates a relation between the rotational speed ω_ref corresponding to the command speed indicating the target speed of the rotor 402, the rotational speed ω determined by the speed determiner 514, and threshold values ωth and ωsnl. The threshold values ωth and ωsnl will be described below. The relation between the rotational speeds ω_ref and ω and the threshold values ωth and ωsnl illustrated in FIG. 5 is to be considered as an example, and is not limited thereto.

According to the present exemplary embodiment, the threshold value ωth of the rotational speed of the rotor 402 for switching between constant-current control and vector control is set. When motor control is switched from constant-current control to vector control, the rotational speed ω of the motor 509 may momentarily decrease. This is because the magnitude of torque generated in the rotor 402 by the driving current supplied first after switching of motor control is smaller than the magnitude of torque generated in the rotor 402 by the driving current supplied last before switching of motor control. Therefore, when the threshold value ωth is set to the lowest rotational speed out of the rotational speeds with which the rotational phase is accurately determined, motor control based on vector control will become unstable when the rotational speed momentarily decreases at the time of switching of motor control. Therefore, it is effective that the threshold value ωth is set to a rotational speed higher than the lowest rotational speed out of the rotational speeds with which the rotational phase is accurately determined, in consideration of the decrease in the rotational speed.

As illustrated in FIG. 4, the CPU 151a outputs the rotational speed ω_ref corresponding to the command speed indicating the target speed of the rotor 402 of the motor 509 to the control switcher 515 and the abnormality discriminator 519. The CPU 151a determines the rotational speed ω_ref based on a variation of the command phase θ_ref in the predetermined time period. More specifically, the rotational speed ω_ref varies at predetermined time intervals.

During control by the constant-current controller 517, when the rotational speed ω_ref reaches or exceeds the threshold value ωth (ω_ref≥ωth), the control switcher 515 switches the controller for controlling the motor 509. More specifically, the control switcher 515 controls the statuses of the switches 516a, 516b, and 516c so as to switch the controller for controlling the motor 509 from the constant-current controller 517 to the vector controller 518. As a result, vector control is performed by the vector controller 518. The threshold value ωth is prestored, for example, in the ROM 151b.

During control by the constant-current controller 517, when the rotational speed ω_ref is lower than the threshold value ωth (ω_ref<ωth), the control switcher 515 does not switch the controller for controlling the motor 509. More specifically, the control switcher 515 controls the statuses of the switches 516a, 516b, and 516c so as to maintain the state where the motor 509 is controlled by the constant-current controller 517. As a result, constant-current control is continued by the constant-current controller 517.

During control by the vector controller 518, when the rotational speed ω_ref becomes lower than the threshold value ωth (ω_ref<ωth), the control switcher 515 switches the controller for controlling the motor 509. More specifically, the control switcher 515 controls the statuses of the switches 516a, 516b, and 516c so as to switch the controller for controlling the motor 509 from the vector controller 518 to the constant-current controller 517. As a result, constant-current control is performed by the constant-current controller 517.

During control by the vector controller 518, when the rotational speed ω_ref is equal to or higher than the threshold value ωth (ω_ref≥ωth), the control switcher 515 does not switch the controller for controlling the motor 509. More specifically, the control switcher 515 controls the statuses of the switches 516a, 516b, and 516c so as to maintain the state where the motor 509 is controlled by the vector controller 518. As a result, vector control is continued by the vector controller 518.

<Step-Out Discrimination>

A method for detecting whether the motor 509 is in a step-out state will be described. In the present exemplary embodiment, the step-out detection in constant-current control is implemented by applying the following configuration to the motor control apparatus 157. In the following descriptions, the circuit for performing vector control is operating also during the period of constant-current control. More specifically, the circuits for determining the rotational phase θ and the rotational speed ω are operating during the period of constant-current control. The circuit for performing constant-current control is operating during the period of vector control.

As illustrated in FIG. 4, the motor control apparatus 157 according to the present exemplary embodiment includes the abnormality discriminator 519 configured to discriminate whether the rotation of the rotor 402 of the motor 509 is abnormal, i.e., whether the motor 509 is in a step-out state. Abnormal states of the rotation of the rotor 402 of the motor 509 include a state where the rotor 402 is locked and a state where the rotational speed of the rotor 402 is reduced, by an external force.

The rotational speed ω_ref output from the CPU 151a and the rotational speed ω output from the speed determiner 514 are input to the abnormality discriminator 519. The abnormality discriminator 519 discriminates whether the motor 509 is in a step-out state based on the rotational speeds ω_ref and ω, and outputs a stop signal to the CPU 151a based on the determination result. The stop signal is a signal for determining whether the motor control apparatus 157 is to be operated or stopped. When the stop signal is 'H (high-level)', the CPU 151a stops the motor control apparatus 157. As a result, the motor 509 stops. When the stop signal is 'L (Low level)', the CPU 151a continues the operation of the motor control apparatus 157. As a result, the motor drive is continued.

Figure 6:
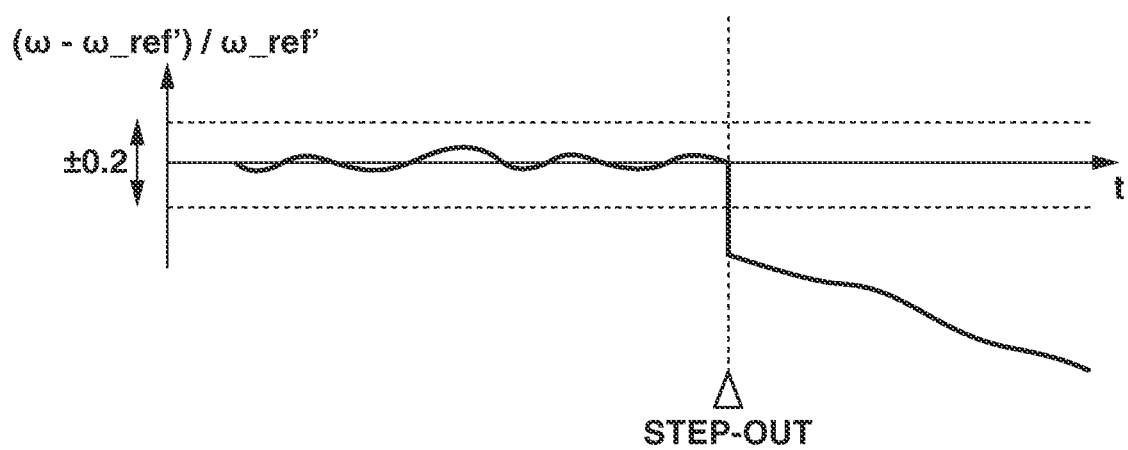
FIG. 6 illustrates a method for performing the step-out discrimination according to the first exemplary embodiment.

FIG. 6 illustrates a method for performing the step-out discrimination according to the present exemplary embodiment. As described above, the step-out discrimination according to the present exemplary embodiment is based on the rotational speeds ω_ref and ω. Specifically, when a value δ obtained by dividing the deviation between the rotational speeds ω_ref and ω by the rotational speed ω_ref is within a predetermined range, the abnormality discriminator 519 outputs the stop signal 'L' to the CPU 151a as a signal indicating that the rotation of the motor 509 is not abnormal. When the value δ is out of the predetermined range, the abnormality discriminator 519 outputs the stop signal 'H' to the CPU 151a as a signal indicating that the rotation of the motor 509 is abnormal. The predetermined range is, for example, a range larger than the variation range of the rotational speed ω at the time when the motor is being controlled, and such a range that the value δ obtained in a case where the motor is in a step-out state is not in the predetermined range.

To correctly perform the step-out discrimination, the rotational speed ω is to be accurately determined. More specifically, the rotational phase θ is to be accurately determined. According to the present exemplary embodiment, the threshold value ωsnl of the rotational speed for the abnormality discriminator 519 to perform the step-out discrimination is set to the lowest rotational speed out of the rotational speeds with which the rotational phase is accurately determined. More specifically, the threshold value ωsnl is set to the threshold value ωth or below. As a result, also in a state where constant-current control is being performed, step-out discrimination is performed if the rotational speed ω is equal to or higher than the threshold value ωsnl.

When the rotational speed ω_ref is lower than the threshold value ωsnl (ω_ref<ωsnl), the abnormality discriminator 519 does not perform the step-out discrimination. When the rotational speed ω_ref is equal to or higher than the threshold value ωsnl (ω_ref≥ωsnl), the abnormality discriminator 519 performs the step-out discrimination. The threshold value ωsnl is prestored, for example, in the ROM 151b.

Figure 7:
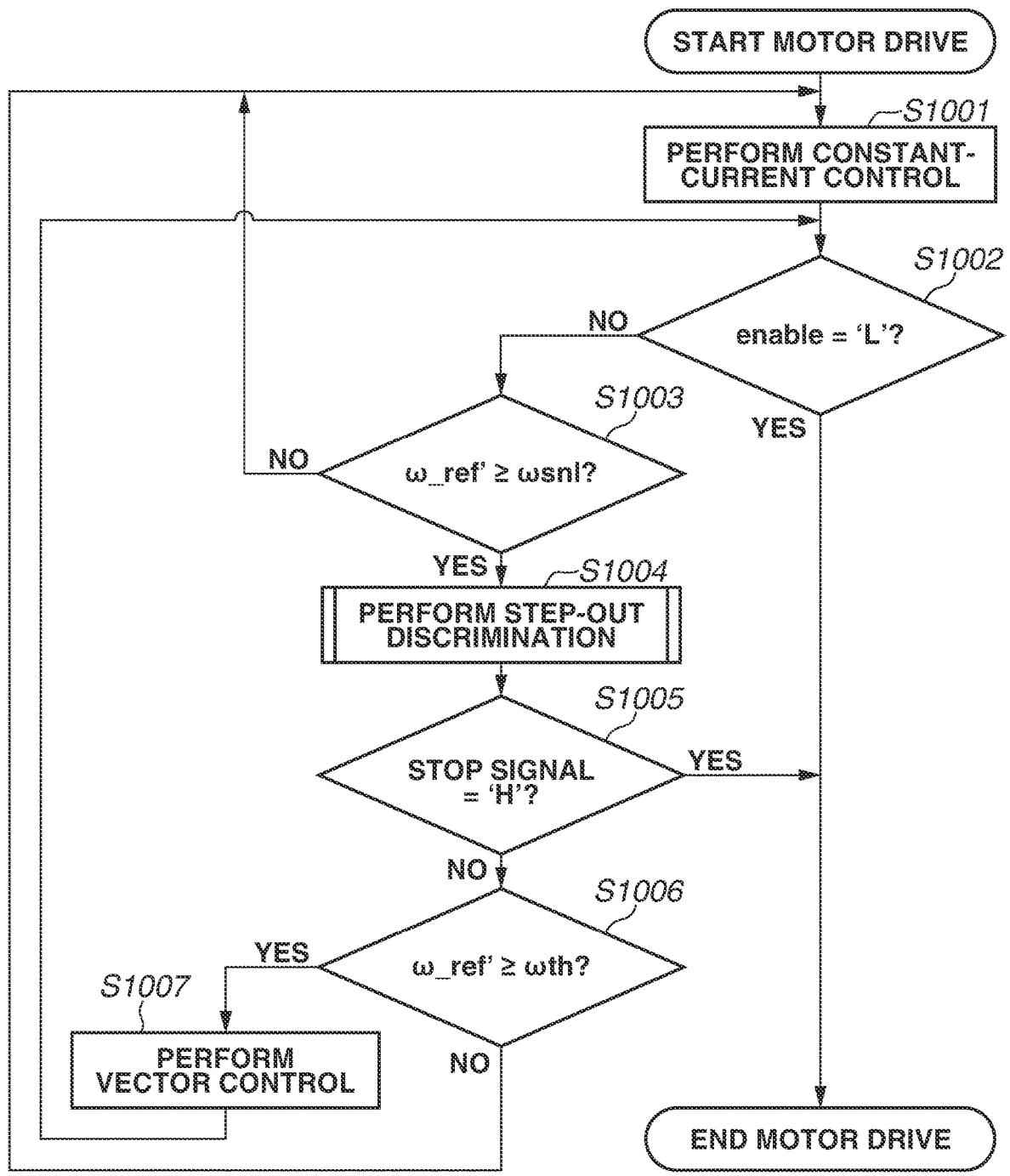
FIG. 7 is a flowchart illustrating a method for performing drive control on a motor by using the motor control apparatus.

FIG. 7 is a flowchart illustrating a method for controlling the motor 509 by using the motor control apparatus 157. Control of the motor 509 according to the present exemplary embodiment will be described below with reference to FIG. 7. Processing of this flowchart is performed by the motor control apparatus 157 which has received a command from the CPU 151a.

First of all, the CPU 151a outputs an enable signal 'H' to the motor control apparatus 157. Then, the motor control apparatus 157 starts the control of the motor 509 based on the command output from the CPU 151a. The enable signal is a signal for permitting or inhibiting the operation of the motor control apparatus 157. When the enable signal is 'L (Low level)', the CPU 151a inhibits the operation of the motor control apparatus 157. More specifically, the motor control apparatus 157 ends the control of the motor 509. When an enable signal is 'H (High level)', the CPU 151a permits the operation of the motor control apparatus 157, and the motor control apparatus 157 controls the motor 509 based on the command output from the CPU 151a.

In step S1001, the control switcher 515 controls the statuses of the switches 516a, 516b, and 516c so as to attain a state where the drive of the motor 509 is controlled by the constant-current controller 517. As a result, constant-current control is performed by the constant-current controller 517.

Subsequently, when the CPU 151a outputs the enable signal 'L' to the motor control apparatus 157 (YES in step S1002), the motor control apparatus 157 ends the drive of the motor 509.

On the other hand, when the CPU 151a outputs the enable signal 'H' to the motor control apparatus 157 (NO in step S1002), the processing proceeds to step S1003.

When the rotational speed ω_ref is lower than the threshold value ωsnl (NO in step S1003), the processing returns to step S1001. In step S1001, the constant-current controller 517 continues constant-current control.

When the rotational speed ω_ref is equal to or higher than the threshold value ωsnl (YES in step S1003), the processing proceeds to step S1004. In step S1004, the abnormality discriminator 519 performs the step-out discrimination by using the above-described method. Then, the processing proceeds to step S1005.

When the abnormality discriminator 519 outputs the stop signal 'H' to the CPU 151a (YES in step S1005), the CPU 151a outputs the enable signal 'L' to the motor control apparatus 157. As a result, the motor control apparatus 157 stops the drive of the motor 509.

When the abnormality discriminator 519 outputs the stop signal 'L' to the CPU 151a (NO in step S1005), the processing proceeds to step S1006.

When the rotational speed ω_ref is equal to or higher than the threshold value ωth, (YES in step S1006), the processing proceeds to step S1007. In step S1007, the control switcher 515 switches the controller for controlling the drive of the motor 509. More specifically, the control switcher 515 controls the statuses of the switches 516a, 516b, and 516c so as to switch the controller for controlling the drive of the motor 509 from the constant-current controller 517 to the vector controller 518. As a result, vector control is performed by the vector controller 518. Then, the processing returns to step S1002.

When the rotational speed ω_ref is lower than the threshold value ωth (NO in step S1006), the processing returns to step S1001. In step S1001, the constant-current controller 517 continues constant-current control.

Subsequently, the motor control apparatus 157 repeatedly performs the above-described control until the CPU 151a outputs the enable signal 'L' to the motor control apparatus 157, thus controlling the drive of the motor 509.

Figure 8:
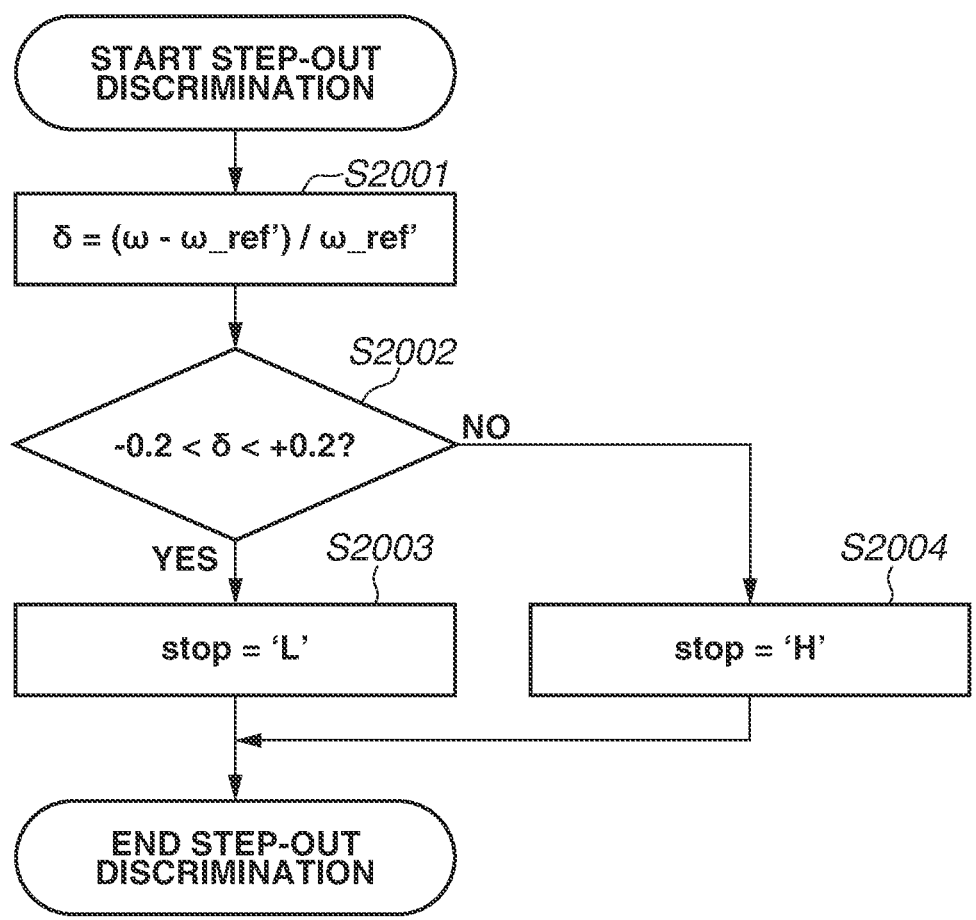
FIG. 8 is a flowchart illustrating a method for performing the step-out discrimination on a motor by using an abnormality discriminator according to the first exemplary embodiment.

FIG. 8 is a flowchart illustrating a method for performing the step-out discrimination on the motor 509 by using the abnormality discriminator 519. A method for performing the step-out discrimination according to the present exemplary embodiment will be described below with reference to FIG. 8. Processing of this flowchart is performed by the abnormality discriminator 519.

In step S2001, the abnormality discriminator 519 calculates the value δ. Then, the processing proceeds to step S2002.

When the value δ is within a predetermined range (YES in step S2002), the processing proceeds to step S2003. In step S2003, the abnormality discriminator 519 outputs the stop signal 'L' to the CPU 151a. When the value δ is out of the predetermined range (NO in step S2002), the processing proceeds to step S2004. In step S2004, the abnormality discriminator 519 outputs the stop signal 'H' to the CPU 151a.

Subsequently, the abnormality discriminator 519 repeatedly performs the above-described method each time it performs the step-out discrimination. The stop signal 'L' is output to the CPU 151a during the period since the time when motor driving control is started till the time when step-out discrimination is performed first.

As described above, in the present exemplary embodiment, the threshold value ωsnl is set to the lowest rotational speed out of the rotational speeds with which the rotational phase is accurately determined. More specifically, the threshold value ωsnl is set to the threshold value ωth or below. As a result, the abnormality discriminator 519 can start the step-out discrimination as quickly as possible. Specifically, also in a state where constant-current control is being performed, the abnormality discriminator 519 can accurately perform the step-out discrimination. Since the CPU 151a is configured to stop the motor 509 if the motor 509 is in a step-out state, it is possible to prevent abnormal sound from occurring because the motor control apparatus 157 drives the motor 509 in a step-out state. Further, since the abnormality discriminator 519 also performs the step-out discrimination during vector control, the CPU 151a can stop the motor 509 even if the motor 509 enters a step-out state because of a rapid load variation during vector control. More specifically, it is possible to prevent abnormal sound from occurring because the motor control apparatus 157 drives the motor 509 in a step-out state.

Although, in the present exemplary embodiment, the abnormality discriminator 519 outputs the stop signal 'H' to the CPU 151a if the value δ is out of the predetermined range, the configuration is not limited thereto. For example, the abnormality discriminator 519 may be configured to output the stop signal 'H' to the CPU 151a if a state where the value δ is out of the predetermined range continues for a second predetermined time period. More specifically, the abnormality discriminator 519 may be configured not to discriminate that the motor 509 is in a step-out state if the value δ once out of the predetermined range becomes a value within the predetermined range within the second predetermined time period.

Although, in the present exemplary embodiment, the range of −0.2 to +0.2 is set as the predetermined range, the predetermined range is not limited thereto. Although, in the present exemplary embodiment, the step-out discrimination is performed based on a value obtained by dividing the deviation between the rotational speeds ω_ref and ω by the rotational speed ω_ref, the discrimination method is not limited thereto. For example, the step-out discrimination may be performed based on the deviation between the rotational speeds ω_ref and co. Further, the step-out discrimination may be performed based only on the rotational speed co. Further, the step-out discrimination may be performed based on the rotational phase θ of the rotor 402.

Although, in the present exemplary embodiment, control switching is performed based on the rotational speed ω_ref output from the CPU 151a, the switching method is not limited thereto. For example, the speed determiner 514 determines the rotational speed ω_ref based on a variation of the command phase θ_ref output from the CPU 151a in a predetermined time period. The control switcher 515 may be configured to switch control based on the rotational speed ω_ref determined by the speed determiner 514.

Although, in the present exemplary embodiment, when determining whether to perform switching between constant-current control and vector control, the control switcher 515 compares the rotational speed ω_ref with the threshold value ωth, the control switcher 515 may compare the rotational speed ω, instead of the rotational speed ω_ref, with the threshold value ωth.

Although, in the present exemplary embodiment, the abnormality discriminator 519 is included in the motor control apparatus 157, the location of the abnormality discriminator 519 is not limited thereto. For example, the abnormality discriminator 519 may be provided out of the motor control apparatus 157.

Although, in the present exemplary embodiment, the rotational speeds ω and ω_ref are determined based on formula (10), the determination method is not limited thereto. For example, the rotational speeds ω and ω_ref may be determined based on a period with which the magnitudes of periodic signals correlated with the rotation period of the rotor 402, such as the driving current iα or iβ, the driving voltage Vα or Vβ, and the induced voltage Eα, or Eβ become 0.

A first control circuit according to the present exemplary embodiment is equivalent to a circuit for controlling the drive of the motor 509 by using the constant-current controller 517. A second control circuit according to the present exemplary embodiment is equivalent to a circuit for controlling the drive of the motor 509 by using the vector controller 518. Although the motor control apparatus 157 according to the present exemplary embodiment includes portions (for example, the current controller 503 and the PWM inverter 506) partially shared by the circuit for performing vector control and the circuit for performing constant-current control, the configuration of the motor control apparatus 157 is not limited thereto. For example, the circuit for performing vector control and the circuit for performing constant-current control may be independently provided.

Figure 9:
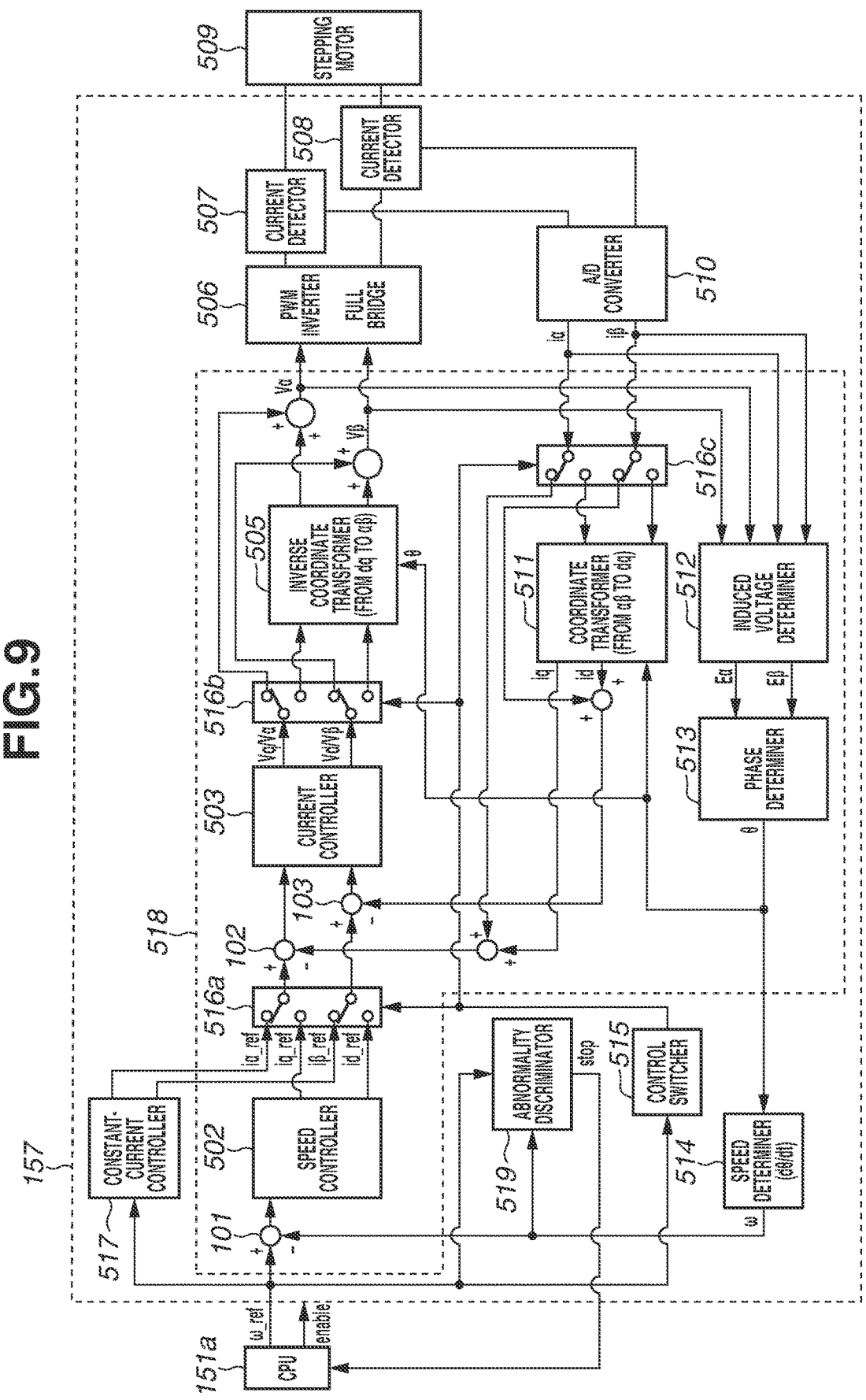
FIG. 9 is a block diagram illustrating a configuration of a motor control apparatus for performing speed feedback control.

Although the motor control apparatus 157 according to the present exemplary embodiment controls the motor 509 by performing phase feedback control, the configuration of the motor control apparatus 157 is not limited thereto. For example, the motor control apparatus 157 may be configured to control the motor 509 by feeding back the rotational speed ω of the rotor 402. Specifically, as illustrated in FIG. 9, a speed controller 502 provided in the motor control apparatus 157 generates and outputs the q-axis current command value iq_ref and the d-axis current command value id_ref so as to reduce the deviation between the command speed ω_ref indicating the target speed of the rotor 402 output from the CPU 151a and the rotational speed co. The motor control apparatus 157 may be configured to control the motor 509 by performing such speed feedback control. Since, in such a configuration, the rotational speed is fed back, the motor 509 is controlled so that the rotational speed of the rotor 402 becomes a predetermined speed. Therefore, the image forming apparatus 100 can suitably perform image forming on a recording medium by applying vector control based on speed feedback control to the motor 509 for driving loads (for example, the photosensitive drum 309 and the conveyance belts 208 and 317) with which the rotational speed of the rotor 402 is to be controlled at a fixed speed.

Although, in the present exemplary embodiment, the stepping motor 509 is used as the motor 509 for driving loads, other motors such as a direct current (DC) motor may be used. The motor 509 is not limited to a 2-phase motor, and may be other motors such as a 3-phase motor.

According to the aspect of the embodiments, step-out discrimination can be accurately performed in a first control mode for controlling a motor by supplying constant currents to the windings of the motor.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A motor control apparatus configured to accelerate a rotor of a motor to a predetermined speed, the motor control apparatus comprising:
   a detector configured to detect a driving current flowing through a winding of a motor;
   a speed determiner configured to determine a rotational speed of a rotor of the motor based on the driving current detected by the detector;
   a phase determiner configured to determine a rotational phase of the rotor of the motor;
   a controller having a first control mode in which a driving current flowing through the winding of the motor is controlled by supplying a constant current to the winding and a second control mode in which vector control to control the driving current flowing through the winding is performed based on a current component of a current value represented by a rotating system of coordinates with reference to the rotational phase determined by the phase determiner, and configured to change a control mode for controlling the driving current flowing through the winding from the first control mode to the second control mode in a case where a value corresponding to the rotational speed of the rotor is changed from a value smaller than a first threshold value to a value larger than the first threshold value in a states where the controller is executing the first control mode,
   wherein the speed determiner determines the rotational speed of the rotor in a state where the controller is executing the first control mode and the value corresponding to the rotational speed of the rotor is larger than a second threshold value smaller than the first threshold value, and
wherein the first threshold value and the second threshold value are smaller than a value corresponding to the predetermined speed.

2. The motor control apparatus according to claim 1, further comprising a determiner configured to determine whether a rotation of the motor has an abnormality based on the rotational speed determined by the speed determiner in the state where the controller is executing the first control mode and the value corresponding to the rotational speed of the rotor is larger than the second threshold value.

3. The motor control apparatus according to claim 2, wherein the abnormality corresponds to a decrease in the rotational speed of the rotor.

4. The motor control apparatus according to claim 1, wherein the second control mode is a control mode for controlling the driving current flowing through the winding so as to reduce a deviation between an instructed speed indicating a target speed of the rotor and the rotational speed determined by the speed determiner.

5. The motor control apparatus according to claim 1, wherein the second control mode is a control mode for controlling the driving current flowing through the winding so as to reduce a deviation between an instructed phase indicating a target phase of the rotor and the rotational phase determined by the phase determiner.

6. The motor control apparatus according to claim 1, wherein the value corresponding to the rotational speed of the rotor is a speed indicating a target speed of the rotor.

7. The motor control apparatus according to claim 1, wherein the value corresponding to the rotational speed of the rotor is the rotational speed determined by the speed determiner.

8. The motor control apparatus according to claim 1, further comprising an inductive voltage determiner configured to determine an inductive voltage induced to the winding by a rotation of the rotor based on the driving current detected by the detector,
   wherein the speed determiner determines the rotational speed of the rotor based on a value of the inductive voltage determined by the inductive voltage determiner.

9. A motor control apparatus configured to accelerate a rotor of a motor to a predetermined speed, the motor control apparatus comprising:
   a detector configured to detect a driving current flowing through a winding of a motor;
   a phase determiner configured to determine a rotational phase of the rotor of the motor based on the driving current detected by the detector; and
   a controller having a first control mode in which a driving current flowing through the winding of the motor is controlled by supplying a constant current to the winding and a second control mode in which vector control to control the driving current flowing through the winding is performed based on a current component of a current value represented by a rotating system of coordinates with reference to the rotational phase determined by the phase determiner, and configured to change a control mode for controlling the driving current flowing through the winding from the first control mode to the second control mode in a case where a value corresponding to the rotational speed of the rotor is changed from a value smaller than a first threshold value to a value larger than the first threshold value in a states where the controller is executing the first control mode,
   wherein the phase determiner determines the rotational phase of the rotor in a state where the controller is executing the first control mode and the value corresponding to the rotational speed of the rotor is larger than a second threshold value smaller than the first threshold value, and
wherein the first threshold value and the second threshold value are smaller than a value corresponding to the predetermined speed.

10. The motor control apparatus according to claim 9, further comprising a determiner configured to determine whether a rotation of the motor has an abnormality based on the rotational phase determined by the phase determiner in the state where the controller is executing the first control mode and the value corresponding to the rotational speed of the rotor is larger than the second threshold value.

11. The motor control apparatus according to claim 10, wherein the abnormality corresponds to a decrease in the rotational speed of the rotor.

12. The motor control apparatus according to claim 9, further comprising an inductive voltage determiner configured to determine an inductive voltage induced to the winding by a rotation of the rotor based on the driving current detected by the detector, wherein the phase determiner determines the rotational phase of the rotor based on a value of the inductive voltage determined by the inductive voltage determiner.

* * * * *